United States Patent [19]

Cohen

[11] Patent Number: 5,385,695
[45] Date of Patent: * Jan. 31, 1995

[54] DEMULSIFIER METHODS EMPLOYING B-IMINODIPROPIONATE

[76] Inventor: Elliot Cohen, 9700 NW. 48th Dr., Coral Springs, Fla. 33076

[*] Notice: The portion of the term of this patent subsequent to May 5, 2009 has been disclaimed.

[21] Appl. No.: 875,429

[22] Filed: Apr. 29, 1992

Related U.S. Application Data

[63] Continuation-in-part of Ser. No. 523,728, May 15, 1990, Pat. No. 5,110,503.

[51] Int. Cl.⁶ .............................................. B01D 17/05
[52] U.S. Cl. ................................. 252/344; 252/328; 252/358; 210/708
[58] Field of Search ............... 252/328, 331, 336, 340, 252/341, 344, 358; 210/708, 705

[56] References Cited

U.S. PATENT DOCUMENTS

| | | | |
|---|---|---|---|
| 2,950,760 | 8/1960 | Bernard. | |
| 2,996,490 | 8/1961 | Rowland et al. | |
| 4,043,908 | 8/1977 | Roberts et al. | 210/43 |
| 4,104,164 | 8/1978 | Chelton | 210/136 |
| 4,118,526 | 6/1975 | Gregorian et al. | 252/307 |
| 4,132,643 | 1/1978 | Hellqvist | 210/84 |
| 4,347,145 | 8/1982 | Gregorian et al. | 252/8.6 |
| 4,390,466 | 6/1983 | Weinberger | 252/548 |
| 4,420,578 | 12/1983 | Hagens | 524/322 |
| 4,427,409 | 1/1984 | Gregorian et al. | 8/107 |
| 4,546,511 | 10/1985 | Kaufmann | 8/158 |
| 4,773,939 | 9/1988 | Meffert et al. | 134/10 |
| 4,797,214 | 1/1989 | Sevier | 218/651 |
| 4,820,450 | 4/1989 | Wile et al. | 252/545 OR |
| 4,846,976 | 7/1989 | Ford | 210/636 |
| 4,857,217 | 8/1989 | Guitieriez | 252/47 |
| 4,956,107 | 9/1990 | Guitieriez | 252/47 |
| 4,963,275 | 10/1990 | Guitieriez | 252/47 |
| 4,978,471 | 12/1990 | Starch | 252/174.15 |
| 4,983,316 | 1/1991 | Starch | 252/174.15 |
| 5,110,503 | 5/1992 | Cohen | 252/344 X |
| 5,207,922 | 5/1993 | McFarlan et al. | 210/708 OR |

FOREIGN PATENT DOCUMENTS 1310341  5/1987  U.S.S.R. ............................ 210/705

OTHER PUBLICATIONS

Alkaril Bulletin 1028/255A.
Deriphat Amphoteric Surfactants pp. 1-37.
Deforest Enterprises Bulletin #720, 110, 109, 1350.

Primary Examiner—Robert L. Stoll
Assistant Examiner—Daniel S. Matzmaier
Attorney, Agent, or Firm—Forrest Collins

[57] ABSTRACT

The present invention deals with compositions utilized to demulsify wash liquors, tramp oils or coolants. The compositions of the present invention are useful per se as cleaning compositions. The ability to rapidly demulsify from a waste liquor solution allows rapid recovery of fats, organic components, paint residues, greases and oils and rapid passage of the effluent to a sewage treatment facility.

16 Claims, No Drawings

DEMULSIFIER METHODS EMPLOYING B-IMINODIPROPIONATE

CROSS-REFERENCE TO RELATED APPLICATION

This is a continuation-in-part of copending application(s) Ser. No. 07/523,728 filed on May 15, 1990, now U.S. Pat. No. 5,110,503, issued May 5, 1992. This application claims the benefit of copending Ser. No. 07/523,728 filed May 15, 1990 by the present author which issued as U.S. Pat. No. 5,110,503 on May 5, 1992. The foregoing patent, the cited publications and patents therein and the prosecution history thereof are specifically incorporated herein by reference.

BACKGROUND OF THE INVENTION

I. This invention relates to demulsifying mixtures of oil and water and in particular demulsification of tramp oils in cutting fluid oils and greases in commercial laundry effluent.

II. Description of the art practices.

In the past, little care was given to effluent waste streams. The consequences of ignoring waste streams lead not only to environmental catastrophe, but also to the loss of valuable resources which could be reclaimed from the effluent stream. In particular, it has become apparent that greases and oils from waste streams may be recovered and sold for industrial purposes. Alternatively, certain oils may be recycled into the process from which they were originally effluted.

It has recently become important, particularly to commercial laundries, that effluent treatment must be accomplished to meet rigid Environmental Protection Agency Standards in the United States. Of course, regulations either exist or are being promulgated in several foreign countries dealing with waste treatment. The current standards for removal of grease and oils from waste water require that a commercial laundry discharge no more than 250 ppm of oils and grease to sewage treatment facilities. While large commercial laundries are capable of meeting the requirements through their greater economic advantage, smaller laundries are indeed suffering in attempting to comply with the rigid standards. It is thus an aspect of the present invention to deal with small commercial laundries and to provide an effective method for meeting EPA grease and oil discharge limits.

It is known from U.S. Pat. No. 4,104,164 issued Aug. 1, 1978 to Chelton, that a system for recovery of large particulate matter may be accomplished through centrifugal separation. The Chelton patent does not deal with any particular chemical means for enhancing the separation of oils and grease from the waste water. U.S. Pat. No. 4,546,511 issued to Kaufmann on Oct. 15, 1985, describes a continuous flow laundry system incorporating a method of fluid flow control. The Kaufmann system requires many tank sand recirculates effluent water to transfer heat to fresh water.

U.S. Pat. No. 4,797,214, issued Jan. 10, 1989, to Sevier, describes a process for treating an emulsion or solution of water and oil by contacting the same with an inorganic salt and a polyelectrolyte flocculant. The Sevier patent describes chemical means which eventually contaminates the water employed with a salt such as sodium chloride and further uses as a demulsifying agent, sulfuric acid. It can be seen that the Sevier method of demulsification has certain inherent difficulties. Meffertet et al, in U.S. Pat. No. 4,773,939, issued Sep. 27, 1988, describes a process of regenerating a soil-laden detergent solution comprising contacting the solution with a soil collector utilizing a polyfunctional quaternary ammonium compound. The difficulty in utilizing any quaternary compound is that any of the material which is discharged is deleterious to bacteria utilized in sewage treatment processes.

U.S. Pat. No. 4,846,976 issued Jul. 11, 1989 to Ford describes a filtration system for treating an emulsion containing water, an oil or a fat, an emulsifying agent and insoluble solid materials such as are present from a maritime oil emulsion containing an anionic detergent and solid greasy calcium salt of the detergent. The Ford patent describes a mechanical means utilizing microfilters for separating the oil or fat from the solid-free emulsion.

A sludge and slime separating and settling device are described in U.S. Pat. No. 4,132,643 issued Jan. 2, 1979 to Hellqvist. The Hellqvist patent states that sludge and slime may be separated from various waste-water sources from laundries, industrial, agricultural, or other sources.

U.S. Pat. No. 4,427,409 issued Jan. 24, 1984 to Gregorian et al describes effluent streams obtained from desizing, scouring and/or bleaching or mercerizing textile fabrics. Various surfactants are described by Gregorian et al for use in the process described there in. Gregorian et al makes further disclosures of compositions for treating textiles in U.S. Pat. Nos. 4,118,526 and 4,347,145 which were issued respectively on Jun. 6, 1975, and Aug. 31, 1982.

U.S. Pat. No. 4,420,578 issued Dec. 13, 1983 to Hagens et al describes methods for cleaning beverage bottles through the use of siloxane compositions. The glass bottle recycling industry generates tremendous volumes of industrial waste containing various organic components including greases. Weinberger in U.S. Pat. No. 4,390,466 issued Jun. 28, 1983 describes various aqueous liquid detergents useful for laundering compositions. Various nonionic surfactants are described in U.S. Pat. No. 4,391,719 issued to Meister on Jul. 5, 1983.

Lancz in U.S. Pat. No. 4,784,788 issued Nov. 15, 1988 describes hard surface viscous cleaning compositions containing various solvents and nonionic surfactants which form a non-flowable gelled composition. The compositions of Lancz also contain water soluble particulate builder-abrasive materials. Wixon in U.S. Pat. No. 4,790,856, issued Dec. 13, 1988 describes nonionic surfactant-cationic fabric softener/anti-static agents containing sulfosuccinamate.

Various iminodipropionate compounds are described in an Industrial Product Directory labeled 12-1282. Similar disclosures are made in an document entitled "Cospha/CD" dated Dec. 18, 1986. A further disclosure of dipropionates is found in a bulletin of Alkaril Chemicals, Inc. bulletin 1028-255 A February 1987. Further disclosures of amphoteric materials are made in a brochure entitled "Properties and Formulations of Deriphat Amphoteric Surfactants" pages 1–37.

Disclosures of Alkyl dipropionates are made in DeForest Enterprises, Inc. bulletin Number 720 REV.2/89. Certain nonionic surfactants are described in bulletin number 110 of DeForest Enterprises, Inc., entitled "DeIONIC LF-EP-16." REV. 12/87. A further disclosure of polyalkoxylated surfactants is found in DeForest Enterprises, Inc. bulletin Number 109, entitled DeIonic LT-EP15, dated 11/89. Further disclosures of amphoteric surfactants are found in DeForest Enterprises, Inc. bulletin 1350, dated 12/89 and entitled "Surfactant AN 5080 S-DF".

The various publications described above disclose the problem of treating waste water effectively to remove fats, organic material, paint pigments, and greases. Yet none of the references taken singly teach the effective method found here in in rapidly demulsifying effluent obtained from sources such as tramp oils or commercial laundries.

U.S. Pat. No. 4,202,795, issued May 13, 1980 to Burnham, et al teaches methods and additives for bringing about the delayed release of a chemical such as a gel breaker or a demulsifier in an aqueous fluid. U.S. Pat. No. 4,734,205 issued Mar. 29, 1988 to Jacques, et al teaches a process stated to be useful for breaking or resolving oil-in-water emulsions, such as those produced during oil recovery operations.

Jacques et al in U.S. Pat. No. 4,202,795 issued Mar. 29, 1988 discloses breaking oil in water emulsions. In U.S. Pat. No. 4,741,835 issued May 3, 1988 to Jacques further discussion of the treatment of waste water with acrylamides.

Spei et al, in U.S. Pat. No. 4,961,858 issued Oct. 9, 1990 teaches demulsifying processes using polyamines. U.S. Pat. No. 4,877,842 issued Oct. 31, 1989 to Burkis et al teaches the reaction products of polyoxyalkylene amines and vinyl monomers for use in breaking emulsions.

Gutierrez et al in U.S. Pat. No. 4,857,217 issued Aug. 15, 1989 discloses amide containing dispersants. A further publication of Gutierrez et al issued as U.S. Pat. No. 4,963,275 on Oct. 16, 1990 teaches amide containing dispersants. Yet another publication of Gutierrez et al issued as U.S. Pat. No. 4,956,107 on Sep. 11, 1990 discloses amide containing dispersants. Suzuki et al in U.S. Pat. No. 4,182,690 issued Jan. 8, 1980, discloses a method of breaking emulsions using a combination of a hydrophobic and hydrophillic components.

In U.S. Pat. No. 4,120,815, issued Oct. 17, 1978 to Raman, there is disclosed diallyl dimethyl ammonium chloride emulsion polymers to break emulsions. Starch in U.S. Pat. No. 4,978,471 issued Dec. 18, 1990 teaches antifoams useful in handling emulsions. Starch's U.S. Pat. No. 4,983,316 issued Jan. 8, 1991 also discloses antifoams useful in handling emulsions.

The present invention deals with an effective composition which will demulsify effluent containing grease and oils. It is also desired to obtain a demulsifying system which does not lessen the cleaning benefits and which may be utilized to enhance cleaning.

Furthermore, it is desirable to have a chemical system for demulsification which may be added either to the wash liquor or which may be used to treat a tank of effluent to bring about rapid demulsification.

Throughout the specific and claims, percentages and ratios are by weight, temperatures are given in degrees Celsius and pressures are given in KPa gauge unless otherwise indicated. To the extent that any references cited here in are applicable to the present invention, they are here by specifically incorporated by reference.

SUMMARY OF THE INVENTION

This invention describes a method for separating organic material from water including the steps of contacting a mixture of organic material and water comprising with the reaction product of an alpha-beta unsaturated acid or salt thereof selected from the group consisting of acrylic and methacrylic acids and mixtures thereof and a short chain organic amine having from 6 to 10 carbons for a sufficient time to effect substantial separation of the organic material from the water.

This invention also describes a composition of matter comprising:

(A) the reaction product of an alpha-beta unsaturated acid and a short chain amine; and (B) at least one member selected from the group consisting of:

(i) an alkoxylated alcohol of the formula:

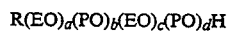

$$R(EO)_a(PO)_b(EO)_c(PO)_dH$$

where R contains from 8 to 14 carbon atoms; a,b,c, and d all have values of one or greater; and EO and PO are ethylene and propylene oxide residues respectively;

(ii) a short chain alkyl sulfate;

(iii) a short chain alkyl sulfonate; and, (iv) a phosphate ester having as the anion there of

$$R'O(AO)_xPO_4$$

where in AO is an alkylene oxide residue and x has a value of from 1 to 10, and R' is a hydrocarbyl residue having from 12 to 24 carbon atoms.

DETAILED DESCRIPTION OF THE INVENTION

The first aspect of the present invention to be discussed is the amphoteric compound denoted as component(A). The amphoteric is typically made by reacting an alpha-beta unsaturated acid and a short chain amine. The reaction product is a beta-amino dipropionate.

The structural formula of the beta-imino dipropionic acid is conveniently written as $RN(CH_2CH_2COOH)_2$. As the compounds are amphoteric materials the charge balance varies and the nitrogen may take one of the hydrogen atoms to become a quaternary leaving a negatively charged carboxyl group. Several forms of the fore going compounds are possible including the disodium or other metallic salts, partial salts and the like. The effectiveness of the present invention is due in part to the fact of the amphoteric nature where by the claimed compositions may be used over a wide pH range.

As previously stated the beta-amino dipropionate compounds are typically obtained from reacting acrylic acid with a short chain amine compound. The short chain amine in the present invention typically contains between six and ten, preferably seven and nine carbon atoms. The amine is preferably one corresponding to eight carbons or a normal octyl group. Alternatively, the short chain amine may be based on a 2-ethylhexyl amine. The fatty amine portion of the molecule is preferably one which is saturated.

Suitable amphoterics for use in the present invention are available from DeForest Enterprises, Inc. of 6421 Congress Avenue, Amtec Center, Boca Raton, Fla. 33487. A preferred product for use as the amphoteric in the present invention is DeTERIC ODP-LF.

The second component of the present invention referred to herein after as (Bi) is an alkoxylated alcohol of the formula $R(EO)_a(PO)_b(EO)_c(PO)_dH$ wherein R contains from 8–14 carbon atoms; a,b,c,d all have values of one or greater and EO and PO are ethylene and propylene oxide residues respectively.

Component (Bi) is conveniently obtained by reacting an alcohol corresponding to 8-14 carbon atoms, preferably 9-13 carbon atoms, derived from a linear or branched saturated alcohol and the corresponding alkylene oxide. That is, the alcohol portion of the molecule is first reacted with ethylene oxide, followed by reaction with propylene oxide, again by ethylene oxide, and finally by propylene oxide. As the manner of reacting alcohols with an alkylene oxide is well known in the art no particular description is given of this feature of the invention. It is noted that a-d typically have values from 1 to 4, typically 2 or 3.

Components (Bii) and (Biii) are discussed together. These components are short chain sulfur containing anionic surfactants. The form of the surfactants is typically that the short chain organic material is one which contains from 7-9 carbon atoms which is reacted to obtain the corresponding sulfate or sulfonate. The cation of these surfactants is typically sodium, potassium, calcium or magnesium. If desired the ammonium cation may be utilized provided the circumstances are such that ammonia is either not liberated or may be vented during processing or use of the compositions.

Components (Bii) and (Biii) are typically obtained from the corresponding short chain saturated hydrocarbons or the corresponding alcohol. Obtaining the sulfate and the sulfonate follows the general procedures described in the art and no particular further discussion is given here.

Component (Biv) is also an anionic surfactant. This material is a phosphate ester of an alkoxylated alcohol. Typically the phosphate ester is obtained through the reaction of an alcohol with an alkylene oxide component and is then capped with the phosphate group which may be obtained from $P_2O_5$ or from a phosphoric acid such as any of the "mainline" polyphosphoric acids.

A preferred phosphate ester for use in the present invention is one obtained from an alkyl phenol which has been reacted with from one to ten moles of ethylene oxide, typically from one to six moles of ethylene oxide. Also suitable as the precursor of the phosphate ester is a long chain alcohol containing from 12 to 24, preferably 14 to 18 carbon atoms. Typical alcohols which may be utilized herein include any of the odd or even numbered carbon alcohols within the foregoing description. Typically, stearyl or oleyl alcohols may be reacted from one to ten moles of ethylene oxide, typically one to six moles of ethylene oxide and used as the base for the phosphate ester. The phosphate ester as the anion has the formula $R'O(AO)_xPO_4$ where $R'$ is the alcohol residue, AO is the alklyene oxide residue and x is the degree of alkoxylation.

The cation of the phosphate ester may be any of the typically used detergent cations such as sodium, potassium, calcium, magnesium, or amines. Where highly acidic cleaners are employed it is possible to use the phosphate ester in its acid form.

A further version of the phosphate esters utilized in the present invention is the 2-ethylhexanol-triethanolamine phosphate ester obtained from the alkylene oxide condensate of 2-ethylhexanol which is then reacted to give the phosphate which is neutralized with the triethanolamine.

AMOUNTS OF THE COMPONENT

Generally speaking, component A may be compounded with any one of components Bi-iv in any desired amount. There are, however, certain preferred ratios depending on the usages of the combination of component A with any particular component B.

Generally speaking, when component A is combined with component (Bi) the alkoxylated alcohol at a weight ratio of 10:1 to 1:10; preferably 5:1 to 1:5.

When combining component A with component (Bii) or (Biii) it is preferable to obtain a 9:1 to 1:1, preferably 8:1 to 2:1 weight ratio of the amphoteric to the anionic. Of course, it must be recognized in using the components of the present invention for demulsification that any extraneous anionic surfactant introduced to the system may vary the amount of the anionic required once such is added in a mixture with the amphoteric. Conveniently, in the scope of the present invention, the amphoteric (A) and component (B) may be sold separately to facilitate mixing to obtain the correct ratios.

Stated otherwise, if it is determined in practice that optimum demulsification is not being obtained, it may be because there is too much of one component or the other in the wash liquor. Accordingly, the amount added for demulsification should be adjusted.

The ratio of the amphoteric to the alcohol alkoxylate phosphate is typically based on a weight ratio of 10:1 to about 1:10, more preferably about 9:1 to about 1:1.

ADDITIONAL COMPONENTS

Depending upon the use of the compositions in the present invention, all manner of ingredients found in such compositions may be used here in. Typically, a laundry detergent will contain alkali metal silicates having a SiO2:Na2O weight ratio of from 3:1 to 1:1. Additional ingredients in laundry compositions include all manner of organic and inorganic detergent builders. Such detergent builders include aluminoslicates, pyrophosphates, and tripolyphosphates and the like. Where the product is utilized for demulsification and is added to the waste wash liquor it is not necessary to utilize such additional ingredients.

If desired, it may be useful to place in the composition of the invention, caustic in such an amount to bring the pH of the resulting solution to the desired level. However, the nature of most demulsification operations requires that an acid pH be utilized whereas in the present invention the ambient liquor pH may be used with great effectiveness.

Where the compositions of the present invention are used in synthetic coolants or cutting fluids, or to demulsify a tramp oil it may be desirable to add additional ingredients such as are found in such compositions including bacteriocides and other stabilizing ingredients.

USE OF THE COMPOSITIONS

The compositions described herein may be used to demulsify various waste water streams and tramp oils. It is merely necessary to obtain the mixture of components through separate addition or by using a mixture of the components such as in a cleaning formulation.

The amphoteric (A) and component (B) are used at a level of 0.01% to 2% by weight of the water in the waste stream. The demulsification proceeds effectively in ten minutes or less, with substantially separation preferably less than 5 minutes at temperatures of 25C to 75C. Cleaning compositions typically utilize the mixture of (A) and (B) at 0.05% to 5% by weight of the water.

What follows are examples of the use of the compositions of the present invention.

EXAMPLE I

A laundry detergent is prepared by combining n-octyl beta-aminodipropionate (Component A) at 7 parts active with 7 parts of the reaction product of isodecyl alcohol with alkylene oxides such as the isodecyl alcohol makes up 24.8% of the molecule such that the first alkylene oxide reactant is ethylene oxide to a total of 26% of the eventual molecule, followed by the addition of propylene oxide to make up the final product of 7.6% propylene oxide; followed by an additional 132.7% of ethylene oxide the total molecule and the remaining 8.7% of the molecule as propylene oxide. The last amount of the propylene oxide may be added incrementally to obtain the desired cloud point of 56C to 63C as measured at 1% by weight in distilled water.

The n-octyl beta-aminodipropionate product may be used to demulsify the waste wash liquor from a commercial laundry by adding 0.2–0.5 parts of the above combination to the waste wash liquor at 99.8–99.5 parts. Other demulsification operations conveniently utilize the beta-aminodipropionate at 0.1 to 2% by weight on a 100% active basis.

The waste wash liquor is allowed to demulsify to recover the oils, greases and fat from the waste wash liquor while allowing the cleaned wash liquor to be passed on for sewage treatment.

EXAMPLE II

A formulation is prepared as Example I with regard to component A. This composition is separated into two parts, one of which is combined at 7 parts of component A to 1 part of a sodium octyl sulfonate. This mixture is utilized to demulsify a waste wash liquor rapidly and to remove substantially all of the grease from the waste wash liquor prior to passing it on to treatment.

The foregoing procedure is carried out a second time using sodium octyl sulfate in place of the sodium octylsulfonate. Substantially similar results are obtained.

Each of the foregoing compositions is utilized as a detergent system for cleaning the contaminated surfaces of a food plant. The various animal fats and oils are rapidly separated upon placing the spent detergent and water in a holding tank. A rapid separation of the fat and oils is observed.

EXAMPLE III

A tramp oil in a synthetic coolant or cleaning fluid is demulsified by combining 5 parts of component A from Example I with 5 parts of a nonylphenol with six moles of ethylene oxide followed by reaction of the resulting nonylphenol alkoxylate with one mole of P2O5.

The foregoing product is observed to rapidly demulsify the tramp oil at a temperature of 25C.

Substantially similar results are obtained by substituting the foregoing phosphate ester with one obtained from oleyl alcohol which has been condensed with 4 moles of ethylene oxide following reaction with P2O5.

Further similar results may be obtained by substituting in the above example a 2-ethylhexanol-triethanolamine salt with component A as described above.

Substantially similar benefits are obtained with synthetic coolants which require demulsification.

EXAMPLE IV

A paint booth is cleaned using a composition containing 0.3% by weight of n-octyl beta-aminodipropionate employed to demulsify the paint from an aqeous waste stream. The effectiveness of the cleaning composition is not adversely affected by the n-octyl beta-aminodipropionate.

Substantially similar results are obtained when using the 2-ethylhexyl beta-aminodipropionate.

EXAMPLE V

The beta-aminodipropionates of Example IV are utilized to separate non-miscible but emulsifiable solvents form an aqueous emulsion. In this example the emulsifiable solvent may be mineral oil, xylene, toluene, mineral spirits or ethylene chloride.

What is claimed is:

1. A method for separating organic material from water including the steps of contacting a mixture of water and an organic material selected from the group consisting of a wash liquor, a tramp oil, a paint, and a grease with the reaction product of (A) an alpha-beta unsaturated acid or salt thereof selected from the group consisting of acrylic and methacrylic acids and mixtures thereof; and (B) a short chain organic amine having from 6 to 10 carbons for a sufficient time to effect substantial separation of the organic material from the water wherein the reaction product is a beta-iminodipropionate.

2. The method of claim 1 wherein the temperature of the mixture of organic material and water during separation is between 25C and 75C.

3. The method of claim 1 wherein the substantial separation of the organic material from the water is in less than 5 minutes.

4. The method of claim 1 wherein the organic material is a paint.

5. The method of claim 1 wherein the organic material is a grease.

6. The method of claim 1 wherein the short chain amine is a primary amine.

7. The method of claim 1 wherein the short chain amine contains 8 carbon atoms.

8. The method of claim 1 wherein the mixture additionally contains caustic or potash.

9. The method of claim 1 wherein the short chain amine is an n-octyl amine.

10. The method of claim 1 wherein the acid is acrylic acid.

11. The method of claim 4 wherein the organic material is a tramp oil.

12. The method of claim 1 wherein the organic, material is a wash liquor.

13. The method of claim 1 wherein the organic material is an acrylic paint.

14. The method of claim 1 wherein the short chain amine is a 2-ethylhexyl amine.

15. The method of claim 1 wherein the short chain amine contains from 7 to 9 carbon atoms.

16. The method of claim 11 further including with the organic material and the water at least one member selected from the group consisting of:

(i) an alkoxylated alcohol of the formula:

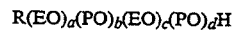

where R contains from 8 to 14 carbon atoms; a,b,c, and d all have values of one or greater; and EO and PO are ethylene and propylene oxide residues respectively;

(ii) a short chain alkyl sulfate;
(iii) a short chain alkyl sulfonate; and,
(iv) a phosphate ester having as the anion there of $$R'O(AO)_xPO_4$$

where in AO is an alkylene oxide residue and x has a value of from 1 to 10, and R' is a hydrocarbyl residue having from 12 to 24 carbon atoms.

* * * * *